Aug. 26, 1941.　　　F. W. KNOBEL　　　2,253,905
CUTTER
Filed Nov. 18, 1940
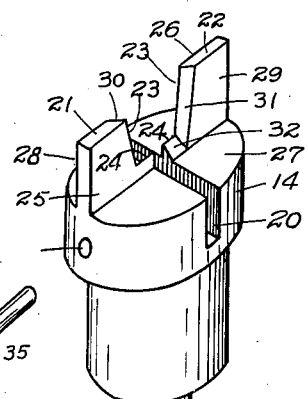
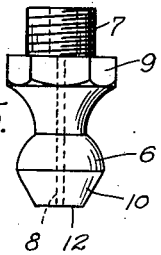
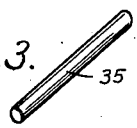
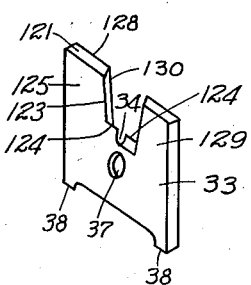
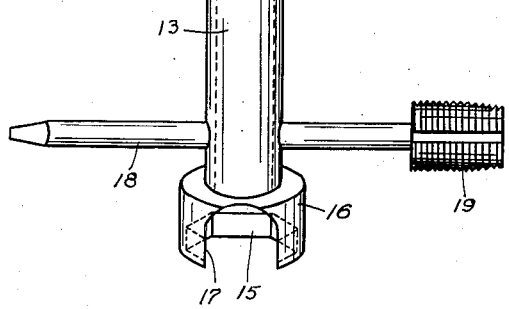
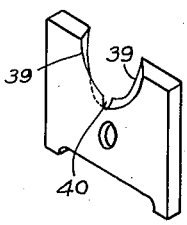
Francis W. Knobel
INVENTOR
BY Zugelter & Zugelter
ATTORNEYS Patented Aug. 26, 1941

2,253,905

UNITED STATES PATENT OFFICE 2,253,905

CUTTER

Francis W. Knobel, Sunburst, Mont.

Application November 18, 1940, Serial No. 366,115

3 Claims. (Cl. 29—105)

This invention relates to a combination tool, and is particularly applicable to the installation, replacement and reconditioning of lubricator fittings of the type commonly considered high pressure fittings.

An object of the present invention is to provide a simple and inexpensive, yet effective tool, whereby lubricator fittings may be installed or removed, or reconditioned without detachment from their use position upon a machine.

Another object of the invention is to provide in a tool of the character stated, a novel and efficient form of cutter head which is self-adjusting to the surfaces of a fitting to be reconditioned, and which may be manufactured and assembled at minimum cost.

Another object is to provide a novel arrangement of simplified cutter means in a refacing tool, which may quickly and easily be subjected to sharpening when desired.

The foregoing and other objects are attained by the means described herein and disclosed in the accompanying drawing, in which:

Fig. 1 is a perspective view of the body of the combination tool, parts being removed therefrom.

Fig. 2 is a perspective view of a floating cutter to be pin-mounted upon the tool head.

Fig. 3 is a view of a cutter supporting pin.

Fig. 4 is a view of a modified form of cutter.

Fig. 5 is an elevational view of a lubricator fitting of the high pressure type, to which the tool of the invention is applicable.

The fitting of Fig. 5 ordinarily will include a bulbous tip or head 6 and a shank including screw threads at 7 whereby the fitting is mounted by screwing its shank into the internally threaded bore of a bearing or other machine part to be lubricated. The fitting has a central bore 8 leading to the hollow shank, and intermediate the shank and the tip is a nut portion 9 to which a wrench may be fitted for tightening the lubricator in position.

In the fitting illustrated, the terminal end portion of the tip has a tapered truncated cone-shaped face 10 and a circular flat forward face 12, both of which areas are adapted to nicely fit the nozzle of a grease gun. In a modified form of fitting, the entire head or tip is spherical or ball-shaped.

The purpose of the present invention is to provide a tool whereby the nozzle receiving areas may with very little effort, be kept or placed in proper condition for reception of the grease gun nozzle, so that leakage at the connection will not occur. As is well known, the fittings accumulate grit and dirt, and sometimes they become slightly mutilated or battered. Before application of the grease gun nozzle thereto, a light refacing to remove accumulations of foreign matter, as well as any slight burrs or irregularities, is considered desirable and effective for assuring ease and facility in performing the greasing operation. The device of the present invention is designed to meet these needs.

Referring to the accompanying drawing, 13 indicates the hollow shank of the tool, which has fixed to one of its ends a cutter head 14. The handle end of the shank preferably includes a wrench socket 15 to fit the nut 9 of the fitting shown in Fig. 5. If the shank 13 be of smaller diameter than the width of said nut, the socket 15 will preferably be formed within a collar or enlargement 16 fixed on the handle end of the shank. On the other hand, if the shank is sufficiently large in diameter, the socket may be formed directly therein. In either case, however, it is desirable to cut a slot 17 in the wall of the socket portion to accommodate fittings of the angular type, wherein the tip is turned laterally to one side for the purpose of accessibility in usage. When used upon a straight fitting like that of Fig. 5, whether it be of the ball type or of the type illustrated, the socket portion will accommodate the fitting nut while the hollow shank 13 receives the tip of the fitting.

A cross bar or handle 18 extends transversely through the shank 13 at a proper distance from the wrench socket so as not to interfere with entry of the fitting tip into the hollow interior of the shank. The cross bar may have at one end a tap 19 carrying threads complementary to the threads on the shank of the fitting, while the opposite end of the cross bar carries an angular tapered nose or suitable implement which may be used in backing out a fitting shank which has broken off behind the nut. The cross bar serves also to afford the necessary leverage for rotating the tool shank when the head of the tool is used in a manner now to be explained.

The tool head may be of hardened steel, with a transverse diametral slot or channel 20 milled or otherwise formed therein. The slot is flanked by a pair of coplanar ears 21 and 22 which are arranged at right angles to the slot and at opposite sides thereof. The ears are ground or otherwise shaped to perform as cutters or shapers for the bearing faces 10 and 12 of the fitting.

Accordingly, each ear is furnished with a side cutting edge 23 and a bottom cutting edge 24. The side cutting edges are formed along the diagonally disposed leading faces 25 and 26 of the ears 21 and 22, respectively, and each is inclined at an angle to the table portion 27 corresponding to the angularity of the truncated cone shaped end of the fitting at 10. The ears project beyond said table portion 27, as do the bottom cutters 24. The sharpened upstanding edges to the bottom cutters are substantially parallel to the table portion of the tool, and they are completely separated by the diametral channel 20.

The leading faces 25 and 26 of the cutter ears are larger in area than the back faces 28 and 29, due to the draft of the cutting edges; that is, the draft faces 30 and 31 of the ears are not at right angles to the planes of the cutting ears, but are ground back so that they extend along chords of a circle outlining the tool head. Due to the fact that the draft faces are inclined to the axis of the tool shank, different points along the length of the side cutter edges are disposed along different chords of the outline circle. From this it will be understood that each bottom cutter edge is at an obtuse angle to its cooperative side cutter edge, but lies in the plane of its leading face. The draft faces 32 of the bottom cutters 24 incline toward the table portion 27 and meet it along the junction lines of the back faces of the side cutters with said table portion.

Attention is now directed to Fig. 2, which shows a floating removable cutter 33 in the form of a hardened steel plate ground or shaped to provide ears with upwardly divergent side cutter edges, bottom cutter edges, and leading and back faces like those of the ears above described. Inasmuch as the constituent parts of the cutter plate 33 are characteristically the same as those of the cutter ears on the tool head, they may be identified by similar reference characters with the prefix "1" added thereto.

In the floating removable cutter of Fig. 2, the bottom cutters 124 are separated by a notch 34, which notch in the assembled condition of the tool is on the rotative center of the tool head. As will be understood, the cutter plate of Fig. 2, when the tool is assembled, rests within the channel 20 at right angles to the ears 21 and 22 of the tool head. A readily displaceable pin 35 is driven into the transverse bore 36 of the tool head and passes through the enlarged aperture 37 of cutter plate 33 for holding it in place, the plate 33 however, being capable of slight shifting movement in all directions, so as to accommodate itself to the faces 10 and 12 of the fitting and to assume a cooperative cutting relationship to the corresponding parts of the tool head cutters. Thus, with the removable cutter plate in final position within the channel 20, there is formed a pocket or cage for reception of the tip end of the fitting, and by rotating the tool shank by means of handle 18, all cutting edges adjust themselves to the fitting tip for cleanly removing any accumulations and trimming off any burrs or irregularities. By this means, the fitting may be reconditioned, or in extreme cases, refaced.

As the rotative center of the tool is without cutting means, due to the provision of notch 34 and channel 20, the tool may not so act upon the fitting as to close or alter the opening 8 thereof. The feet 38 at opposite ends of the base edge of cutter plate 33 determine the elevation of the bottom cutters 124 with respect to cutters 24 of the head, and by keeping all of said bottom cutters at a common elevation, the feet assure a maximum refacing performance of said cutters. Feet 38, of course, may be omitted if proper care is exercised in fitting the removable cutter plate to the bottom of channel 20.

As will be understood, any necessary touching up of the cutting edges of head 14 by means of a grinding wheel is easily accomplished upon removal of the floating cutter blade 33, as a side cutter and its adjacent bottom cutter may be ground simultaneously by a side and an edge of the grinding wheel. The same is true of the detached cutter 33. In this connection, it may be considered desirable to omit the bottom cutters 24 of the head so as to simplify reconditioning of the tool for cutting. The advantage of lengthwise shiftability of the cutter 33 within channel 20 for purposes of self-adjustment, is to be noted.

The illustration of Fig. 4 is for the purpose of showing how the cutter would be shaped in order to accommodate a fitting having a ball or spherical tip. Here, the cutting edges are arcuate, as indicated by the characters 39. A notch 40 separates the cutting edges. When the Fig. 4 type of cutter is employed, the fixed cutter of the tool head will, of course, be correspondingly shaped.

It is to be understood that various modifications and changes in the structural details of the tool may be made, within the scope of the appended claims, without departing from the spirit of the invention.

What is claimed is:

1. A reconditioning tool for a lubricator fitting having a tip to fit a grease gun nozzle, comprising a shank having a cutter head thereon, said head being equally divided by a diametral deep channel which includes the shank axis, and bored at right angles to and through the channel side walls, a substantially flat table portion on an end of the cutter head, also divided by said channel, a pair of integral ears each upstanding at right angles upon and beyond said table portion in coplanar relationship to one another, said ears having leading faces with diagonally opposed edges thereof sharpened to provide side cutters arranged in convergency toward the table portion of the cutter head, a portion of each ear being sharpened along a line adjacent and substantially parallel to the table portion to provide bottom cutters extending to the channel aforesaid, a floating apertured blade received in the channel and including side cutters and bottom cutters corresponding to those of the ears on the head, said bottom cutters being separated by a notch centrally located with respect to the length of the blade, a pin of smaller diameter than the floating blade aperture, and extending through the bore of the head and the aperture of the blade for loosely connecting the blade to the head, and cooperative means on the blade and the head for establishing a common elevation of the bottom cutters of the blade and the head when the tool is applied to a lubricator tip to be reconditioned.

2. A reconditioning tool for a lubricator fitting having a tip to fit a grease gun nozzle, comprising a shank having a cutter head thereon, said head being equally divided by a diametral deep channel which includes the shank axis, and bored at right angles to, and through, the channel side walls, a substantially flat table portion on an end of the cutter head and separated into sections by the channel aforesaid, a flat ear upstanding upon each table portion section at right angles thereto, both ears being in a common plane transverse to the plane of the dividing channel, convergent cutter edges on the ears including bottom sections terminating at the channel side walls, a flat blade including opposed coplanar ears having convergent cutter edges spaced apart and inclined in correspondency with the cutter edges of the head, said blade being received in the diametral channel of the head, and means cooperating with the bore of the head for shiftably securing the blade within the channel in position to dispose the ears and their cutting edges to pocket formation for reception of a lubricator tip.

3. A reconditioning tool for a lubricator fitting having a tip to fit a grease gun nozzle, comprising a shank having a cutter head thereon, said head being equally divided by a diametral deep channel which includes the shank axis, and bored at right angles to, and through, the channel side walls, a substantially flat table portion on an end of the cutter head and separated into sections by the channel aforesaid, a flat ear upstanding upon each table portion section at right angles thereto, both ears being in a common plane transverse to the plane of the dividing channel, convergent cutter edges on the ears including bottom sections terminating at the channel side walls, a flat blade including opposed coplanar ears having convergent cutter edges spaced apart and inclined in correspondency with the cutter edges of the head, said blade being received in the diametral channel of the head, and means cooperating with the bore of the head for shiftably securing the blade within the channel in position to dispose the ears and their cutting edges to pocket formation for reception of a lubricator tip, all of the convergent cutting edges being equidistant from the axis of the shank leaving a central notched area free of any cutting function and disposed out of range of contact with such lubricator tip.

FRANCIS W. KNOBEL.